United States Patent [19]

Tack

[11] Patent Number: 4,715,753
[45] Date of Patent: Dec. 29, 1987

[54] TOOL-HEAD/TOOL-HOLDER COUPLING

[75] Inventor: Hans Tack, Velbert, Fed. Rep. of Germany

[73] Assignee: Fried. Krupp Gesellschaft mit beschränkter Haftung, Essen, Fed. Rep. of Germany

[21] Appl. No.: 6,707

[22] Filed: Jan. 23, 1987

[30] Foreign Application Priority Data

Jan. 25, 1986 [DE] Fed. Rep. of Germany ....... 3602247

[51] Int. Cl.$^4$ .................. B23B 29/04; B23B 29/34
[52] U.S. Cl. ............................ 409/234; 82/36 B; 403/322; 407/101
[58] Field of Search ............... 82/36 B, 36 R, 36 A; 409/232–234; 279/1 B; 403/322, 374; 408/238, 239 R, 239 A; 407/46, 101

[56] References Cited

U.S. PATENT DOCUMENTS 4,391,543  7/1983  Elsing ........................ 403/322 X
4,414,724 11/1983  Garnett ...................... 82/36 B X

FOREIGN PATENT DOCUMENTS 2701337  7/1978  Fed. Rep. of Germany ...... 409/234

Primary Examiner—Gil Weidenfeld
Assistant Examiner—Steven C. Bishop
Attorney, Agent, or Firm—Spencer & Frank

[57] ABSTRACT

A coupling for connecting a tool head and a tool holder. The tool head is inserted with an at least partially conical receiving pin into a correspondingly configured receiving bore in the tool holder. Tool head and tool holder are actuated by clamping elements so that a contact collar on the tool head rests against the counterface of the tool holder. The clamping device is composed of a clamping slide which is movable in the longitudinal direction of the tool holder. In the front part of the clamping slide, movable clamping jaws are provided which cooperate with a pin fixedly disposed in the tool holder in such a manner that movement of the clamping slide initiated during insertion of the receiving pin into the receiving bore causes the clamping jaws to be pushed onto the pin and to thus grip behind an annular groove in the blind bore of the tool head, thus causing the tool head to be locked to the tool holder.

21 Claims, 4 Drawing Figures

TOOL-HEAD/TOOL-HOLDER COUPLING

BACKGROUND OF THE INVENTION

1. Field of the Invention

The present invention relates to a coupling for the connection of a tool holder to an interchangeable tool head in a machine tool in which the tool head is provided with a preferably at least partially conical receiving pin and an annular contact collar forming a supporting face, the receiving pin and the contact collar cooperating with a corresponding receiving bore and a counterface on the tool holder which cooperates with the contact collar. The tool holder and tool head are arrested by means of clamping elements which are actuated by means of a clamping device so that the contact collar of the tool head rests firmly against the counterface of the tool holder.

2. Description of the Prior Art

The task of exchanging tools as quickly as possible in machine tools has become increasingly significant with the increasing desire for cost-effective operation. Various coupling systems have been proposed to solve this problem. In these coupling systems, the releasable coupling between an exchangeable tool head and a tool holder resides in the fact that the tool holder has a receiving pin onto which a corresponding bore in the tool head is placed. After being placed in the tool holder, the tool head is arrested by means of suitable clamping elements which are usually actuated by a pull rod that is displaceable axially with respect to the tool holder.

The receiving pin of the tool head is generally cylindrical, sometimes conical. The conical configuration has the advantage that the receiving pin of the tool head can easily be inserted into the corresponding receiving bore of the tool holder. However, the self-inhibition of conical connections is a drawback for the quick exchange of tool heads. It has also been found that if a conical receiving connection is used, the high rigidity and accurate positioning necessary in tools subject to high stresses can be realized only if, in addition to the conical radial guidance which is thus without play, there also exists an axial contact between tool head and basic holder. The simultaneous fixing of the tool head by means of a conical connection and planar contact has been possible in the past only in that deformable intermediate pieces were provided between the tool head and the receptacle in the basic holder or in that, during closing of the coupling system, deformation of the material of the receiving elements themselves, i.e. at the receiving pin and/or in the receiving bore, was permissible. To realize such deformation, however, extremely high tension and ejection forces are required which the actuating device must be able to handle. The components of this actuating device must be dimensioned accordingly and, since they are difficult to accommodate, require much space.

SUMMARY OF THE INVENTION

It is an object of the present invention to provide a coupling between tool head and tool holder which, not only permits the tool head to be reliably guided radially without play in the tool holder and assures the necessary rigidity of the connection, but is also of simple and space saving design. Additionally, the coupling is very easy to lock and unlock.

This is accomplished by a coupling which has the features of a tool head and a tool holder, with the tool head being inserted by means of an at least partially conical receiving pin into a correspondingly configured receiving bore in the tool holder. Tool head and tool holder are actuated by means of clamping elements so that a contact collar on the tool head rests against the counterface of the tool holder. The clamping device is composed of a clamping slide which is movable in the longitudinal direction of the tool holder. In the front part of the clamping slide, movable clamping jaws are provided which cooperate with a pin fixedly disposed in the tool holder in such a manner that movement of the clamping slide initiated during insertion of the receiving pin into the receiving bore causes the clamping jaws to be pushed onto the pin and to thus grip behind an annular groove in the blind bore of the tool head, thus causing the tool head to be locked to the tool holder. Such a connection is very simple in structure. It requires only a few moving parts and provides a reliable and firm connection between the interchangeable tool head and the tool holder. With the aid of the coupling according to the invention, it is possible to interchange tool heads quickly and without endangering the operation.

DESCRIPTION OF THE PREFERRED EMBODIMENTS

Figure 3:
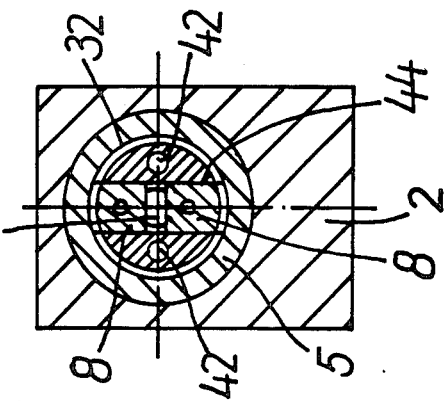
FIG. 3 is a sectional view along line I—I of FIG. 1.
Figure 1:
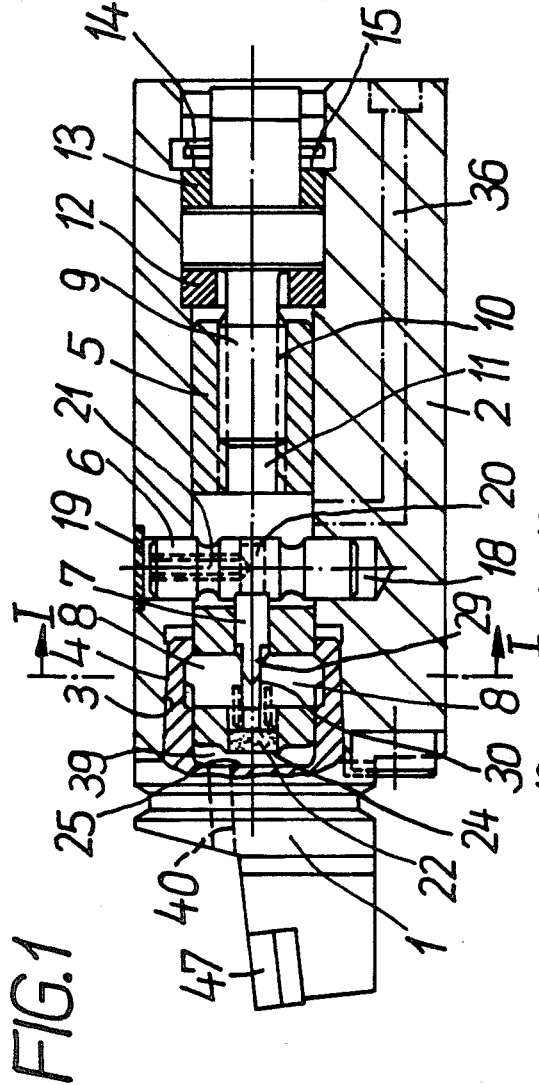
FIG. 1 is a partial longitudinal sectional view of the coupling between tool head and tool holder in a lathe.
Figure 2:
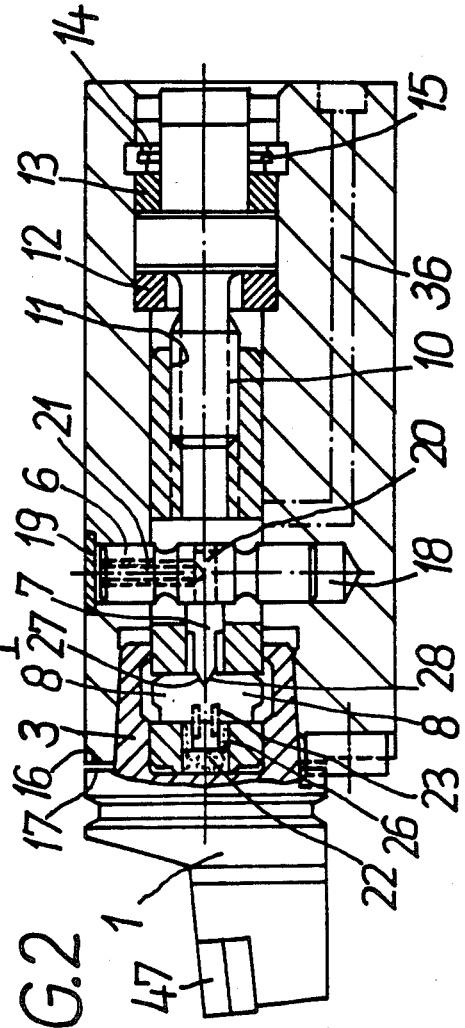
FIG. 2 shows the coupling of FIG. 1 in the unlocked state.
Figure 4:
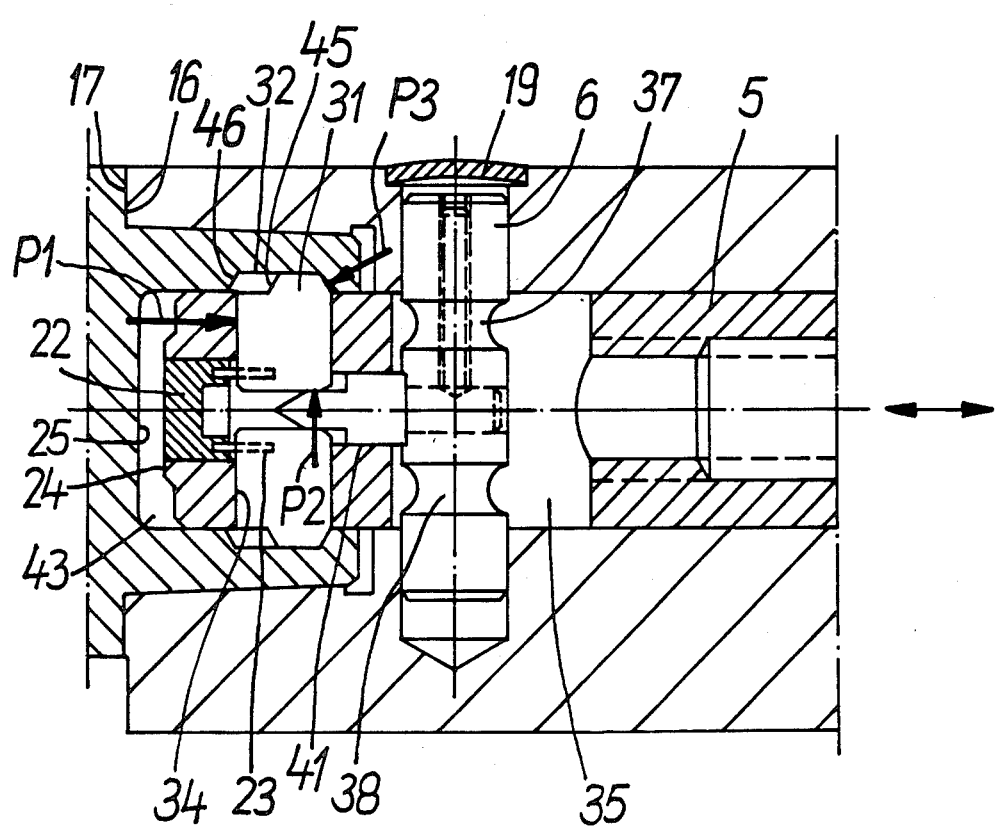
FIG. 4 is an enlarged view of the locking components of the coupling.

In FIGS. 1 and 2, the tool head 1 can be brought, either manually or automatically, by means of a gripper device (not shown), to a tool holder 2. In the course of this process, the conical clamping pin 3 of tool head 1 is introduced into a corresponding receiving bore 4 in tool holder 2. Tool holder 2 includes a clamping device composed essentially of a clamping slide 5, a staybolt 6, spreading elements composed of the pin 7 of staybolt 6 and clamping jaws 8. The clamping device also includes a clamping screw 9 whose thread 10 interacts with a counterthread provided in bore 11 of clamping slide 5. Bearing discs 12 and 13 guide clamping screw 9. The clamping screw 9 is secured by segments 14 which are held by a clamping ring 15.

Rotation of clamping screw 9 causes clamping slide 5 to be moved in the axial direction; when the screw is turned to the left, slide 5 moves toward the tool head, when the screw is turned to the right, slide 5 moves in the opposite direction.

A radial planar face 16 is disposed at the frontal side of tool holder 2 and cooperates with a corresponding counterface 17 of the tool head.

Staybolt 6 is disposed in a blind bore 18 provided in basic holder 2 transverse to its longitudinal axis and is covered by a cap 19. In the longitudinal axis of the tool holder, pin 7 is inserted perpendicular to the axis of staybolt 6 into a corresponding bore 20 of staybolt 6 and is secured by a securing screw 21.

An elastic element 22 is provided in the front part of tool holder 2, i.e. in a longitudinal bore 26 of clamping slide 5. Securing pins 23, which serve to retain clamping jaws 8 of the locking system, engage in this elastic element 22.

The illustrated tool coupling operates as follows:

When tool head 1 is brought toward tool holder 2, its conical receiving pin 3 enters into the corresponding bore in basic holder 2. This causes the front portion of clamping slide 5 to enter into blind bore 43 in receiving pin 3 of tool head 1. As soon as frontal face 24 of clamping slide 5 comes in contact with basic face 25 of blind bore 43 of tool head 1, clamping screw 9 of clamping slide 5 is caused to turn to the right, thus being moved in the direction toward clamping screw 9, i.e. away from tool head 1. The result is that the catch slopes 27 of clamping jaws 8, which are arranged to be radially movable in corresponding recesses 44 of clamping slide 5, abut on the geometrically correspondingly shaped tip 28 of pin 7. Thus, the further movement of clamping slide 5 forces the clamping jaws 8 radially apart until the parallel faces 29 of pin 7 meet the base faces 30 of clamping jaws 8. Pin 7 thus acts as a spacer and prevents clamping jaws 8 from sliding back.

Due to the radial displacement of clamping jaws 8, tongues 31 of clamping jaws 8 are pressed into an annular groove 32 disposed in blind bore 43 in clamping pin 3. This causes a form-locking connection to be established between clamping slide 5 and clamping pin 3 of tool head 1 and, upon further actuation of clamping screw 9, tool head 1 is pulled further into the receiving bore of basic holder 2 until clamping pin 3 rests in bore 4 without play. When the clamping screw 9 is rotated further, the material in the wall of bore 4 and also clamping pin 3 are deformed until counterface 17 of tool head 1 also lies against planar face 16 of tool holder 2. This requires only a very slight axial movement of clamping slide 5, which movement lies in a range of a few tenths of a millimeter and is a function of the selected pitch of the cone employed.

The forces ($P_3$) which now act on clamping jaws 8 are absorbed axially ($P_1$) by guide face 34 of clamping slide 5 and radially ($P_2$) by pin 7 which here acts as a spacer. The axial mobility of clamping slide 5, which has a cylindrical cross section, is assured by an elongated aperture 35 in clamping slide 5 through which staybolt 6 passes. Elongated aperture 35 serves the additional purpose of receiving coolant supplied through a bore 36 in tool holder 2. The coolant is conducted from the elongated aperture 35 through grooves 37, 38 in staybolt 6 and through bores 42 in clamping slide 5 into the free space 39 in tool head 1, from where it is finally able to exit through bore 40 and its opening in the vicinity of the cutting edge 47 of the tool.

Unlocking and ejection of tool head 1 is initiated and effected by turning clamping screw 9 to the left. The clamping slide 5 then moves in the direction of tool head 1 and pin 7, which was held in staybolt 6, and is guided in a bore 41 of clamping slide 5, unlocking clamping jaws 8. Finally, when faces 45 of clamping jaws 8 abut the sloping side faces 46 of groove 32, the clamping jaws 8 will begin to move radially again in the direction toward the center axis of tool holder 2, thus causing tool head 1 to be unlocked.

Once clamping jaws 8 have returned to their original position, in which position they are held in elastic elements 22 by means of securing pins 23, frontal face 24 of clamping slide 5 abuts on the base face of blind bore 43 in tool head 1 and presses the latter out of the conical receiving bore 4 of tool holder 2.

Couplings of the above described type are particularly suitable for conical connections between a tool head and a tool holder of the self-inhibiting type. However, they can also be used for cylindrical or combined cone/cylinder tool receptacles.

The invention now being fully described, it will be apparent to one of ordinary skill in the art that many changes and modifications can be made thereto without departing from the spirit or scope of the invention as set forth herein.

The present disclosure relates to the subject matter disclosed in German Patent application, Ser. No. P 36 02 247.0 of Jan. 25th, 1986, the entire specification of which is incorporated herein by reference.

What is claimed is:

1. Coupling for the connection of a tool head having a planar face and defining therewith a blind bore with a groove and a contact collar external to said bore and a tool holder having a counterface opposing said collar in a machine tool having an interchangeable tool head provided with an at least partially conical receiving pin and an annular contact collar, both cooperating with a corresponding receiving bore and an annular counterface of the tool holder, with tool holder and tool head being actuated by means of clamping elements which are themselves actuated by way of a clamping device and being locked in such a manner that the contact collar of the tool head rests against the counterface of the tool holder, the coupling comprising a clamping slide in the tool holder and arranged movably therein in longitudinal direction of the tool holder, the clamping slide having a frontal face cooperating with the planar face of the tool head in said blind bore in the tool head, radially movable clamping jaws in the front portion of said tool head, a pin fixed to the tool holder and cooperating with said clamping jaws and responsive to the clamping jaws being pushed over said pin to grip behind said groove in the receiving bore of the tool head and lock said tool head in its end position in such a manner that its contact collar rests firmly against the counterface of the tool holder.

2. Coupling for the connection of a tool head and a tool holder in a machine tool as defined in claim 1, further including a staybolt held in the tool holder and disposed in the longitudinal axis of the tool holder said staybolt having slopes at its tip which cooperate with base faces of the clamping jaws in the clamping slide, the pin being fastened in said staybolt.

3. Coupling for the connection of a tool head and a tool holder in a machine tool as defined in claim 2, wherein the number of slopes at the tip of the pin of the staybolt corresponds to the number of clamping jaws in the clamping slide.

4. Coupling for the connection of a tool head and a tool holder in a machine tool as defined in claim 2, wherein the tip of the pin is conical.

5. Coupling for the connection of a tool head and a tool holder in a machine tool as defined in claim 1, wherein said blind bore disposed in the conical receiving pin of the tool head, ends in a planar face which cooperates with the frontal face of the clamping slide.

6. Coupling for the connection of a tool head and a tool holder in a machine tool as defined in claim 2, wherein an elongated aperture is disposed in the clamping slide, the staybolt extending through said elongated aperture.

7. Coupling for the connection of a tool head and a tool holder in a machine tool as defined in claim 1, wherein an annular groove is disposed in the blind bore in the receiving pin of the tool head, said clamping jaws being pressed into said annular groove when they abut on the pin during displacement of the clamping slide.

8. Coupling for the connection of a tool head and a tool holder in a machine tool as defined in claim 7, wherein the side faces of the annular groove in the blind bore of the receiving pin of the tool holder are sloped.

9. Coupling for the connection of a tool head and a tool holder in a machine tool as defined in claim 1, further including a screw disposed in the longitudinal direction of the tool holder for actuating the clamping slide.

10. Coupling for the connection of a tool head and a tool holder in a machine tool as defined in claim 1, further including a hydraulic element provided in the tool holder for actuating the clamping slide.

11. Coupling for the connection of a tool head and a tool holder in a machine tool as defined in claim 1, further including an elastic element disposed in the front portion of the clamping slide pins which cooperate with said elastic element.

12. Coupling for the connection of a tool head and a tool holder in a machine tool as defined in claim 1, further comprising a channel in the tool holder and further channels in the clamping slide and means to supply coolant therethrough to the tool head, said coolant exiting in the vicinity of the cutting edge of the tool.

13. Coupling for the connection of a tool head and a tool holder in a machine tool as defined in claim 1, wherein the clamping slide has a cylindrical cross section and is disposed in a longitudinal axis of the tool holder.

14. Coupling for the connection of a tool head and a tool holder in a machine tool as defined in claim 13, wherein the element for actuating the clamping slide is disposed in the longitudinal axis of the clamping slide.

15. Coupling for the connection of a tool head and a tool holder in a machine tool as defined in claim 3, wherein said blind bore disposed in the conical receiving pin of the tool head, ends in a planar face which cooperates with the frontal face of the clamping slide.

16. Coupling for the connection of a tool head and a tool holder in a machine tool as defined in claim 6, wherein an annular groove is disposed in the blind bore in the receiving pin of the tool head, said clamping jaws being pressed into said annular groove when they abut on the pin during displacement of the clamping slide.

17. Coupling for the connection of a tool head and a tool holder in a machine tool as defined in claim 8, further including a screw disposed in the longitudinal direction of the tool holder for actuating the clamping slide.

18. Coupling for the connection of a tool head and a tool holder in a machine tool as defined in claim 7, further including a hydraulic element provided in the tool holder for actuating the clamping slide.

19. Coupling for the connection of a tool head and a tool holder in a machine tool as defined in claim 10, further including an elastic element disposed in the front portion of the clamping slide pins which cooperate with said elastic element.

20. Coupling for the connection of a tool head and a tool holder in a machine tool as defined in claim 11, further comprising a channel in the tool holder and further channels in the clamping slide and means to supply coolant therethrough to the tool head, said coolant exiting in the vicinity of the cutting edge of the tool.

21. Coupling for the connection of a tool head and a tool holder in a machine tool as defined in claim 12, wherein the clamping slide has a cylindrical cross section and is disposed in a longitudinal axis of the tool holder.

* * * * *